(12) United States Patent
Biltz

(10) Patent No.: US 9,779,459 B2
(45) Date of Patent: Oct. 3, 2017

(54) SOCIAL IN LINE CONSUMER INTERACTION LAUNCH PAD

(71) Applicant: Accenture Global Services Limited, Dublin (IE)

(72) Inventor: Michael J. Biltz, San Francisco, CA (US)

(73) Assignee: Accenture Global Services Limited, Dublin (IE)

(*) Notice: Subject to any disclaimer, the term of this patent is extended or adjusted under 35 U.S.C. 154(b) by 946 days.

(21) Appl. No.: 13/786,953

(22) Filed: Mar. 6, 2013

(65) Prior Publication Data

US 2013/0246225 A1    Sep. 19, 2013

Related U.S. Application Data

(60) Provisional application No. 61/610,879, filed on Mar. 14, 2012.

(51) Int. Cl.
*G06Q 30/06* (2012.01)
*G06Q 50/00* (2012.01)
*G06Q 30/08* (2012.01)

(52) U.S. Cl.
CPC ......... *G06Q 50/01* (2013.01); *G06Q 30/0601* (2013.01); *G06Q 30/0641* (2013.01)

(58) Field of Classification Search
CPC ................... G06C 30/06; G06C 30/08

USPC ................................ 705/26.1, 27.1
See application file for complete search history.

(56) References Cited

U.S. PATENT DOCUMENTS

| | | | |
|---|---|---|---|
| 2005/0099407 A1* | 5/2005 | Pennington | G06F 3/04883 345/179 |
| 2010/0205541 A1* | 8/2010 | Rapaport | G06Q 10/10 715/753 |
| 2013/0204728 A1* | 8/2013 | Lichterman | G06Q 10/00 705/26.1 |

* cited by examiner

*Primary Examiner* — James Zurita
(74) *Attorney, Agent, or Firm* — Brinks Gilson & Lione

(57) ABSTRACT

The social in line consumer interaction launch pad is a digital commerce service that integrates into digital social forums that allows users (e.g., consumers) to perform commerce functions within a social conversation (e.g., interaction) without leaving the social forums. The launch pad automatically determines whether the conversation is about a company, brand, product and/or service, and converts text entered during the conversation into a 'hypertext link-mouse over-launch pad' for users to view and respond to services related to the brand, product and/or service based context. The launch pad is implemented through alliances with social forum service providers and/or a web browser plug-in to tag input (e.g., free form text) within reviews, comments, and unstructured data, selectable to initiate an interaction and/or transaction with the company of the brand and/or product. The launch pad determines the content to provide based on context information and demographics of the author and/or recipient.

20 Claims, 6 Drawing Sheets

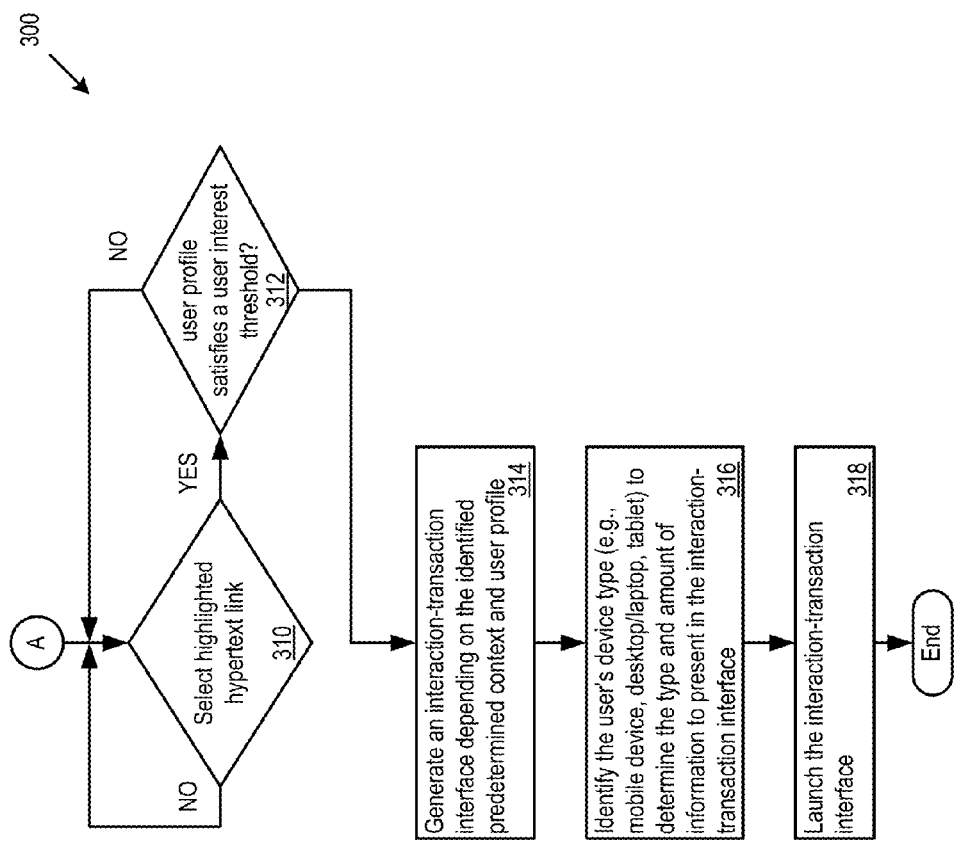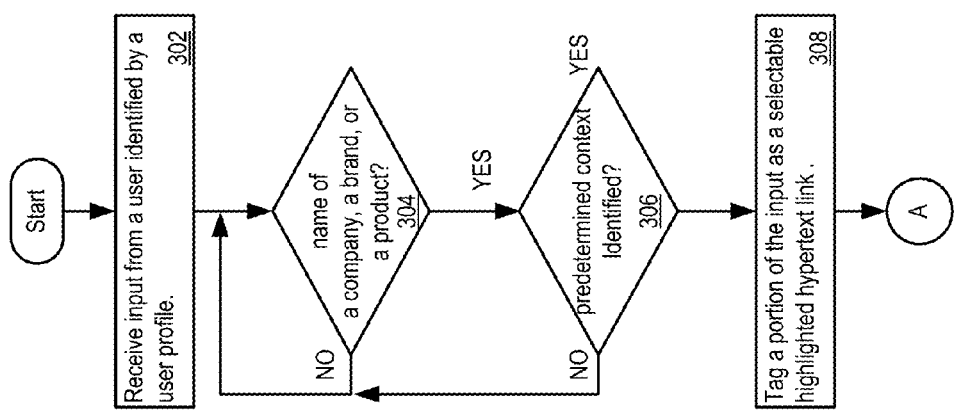
FIG. 3

FIG. 5

| Memory 502 | |
|---|---|
| Launch Pad Logic 504 | Launch Pad Browser Plug-in 536 |
| User Input 506 | Social Forum Application Programming Interface (API) 538 |
| User Profile 508 | Identified Predetermined Context 514 |
| User Interest Threshold 510 | Interaction-Transaction Interface 516 |
| Portion of Input Identified 512 | Selectable Option to Purchase 520 |
| Social Forum User Analytics 522 | Selectable Information to View 518 |
| Identified User Type 524 | Social Forum Policy Rules Identifier 530 |
| Auto Complete Content 526 | Social Forum Native Currency 532 |
| User Device 528 | User Selected Credit / Currency 534 |

500

SOCIAL IN LINE CONSUMER INTERACTION LAUNCH PAD

PRIORITY CLAIM

The application claims the benefit of priority to U.S. provisional application Ser. No. 61/610,879, filed on Mar. 14, 2012.

TECHNICAL FIELD

The present description relates to a digital commerce service integrated into social forums for users to easily and efficiently use. This description also relates to a way to automatically determine from user interactions whether to present a launch pad to perform commerce functions, such as customer relationship management (CRM) interactions, within a social forum or web browser without leaving the current interaction.

BACKGROUND

Currently, on line social commerce is approximately 25% or more of Internet traffic conducted through social channels. Many companies are interested in how to monetize or make money from the interactions that occur in the social forums (e.g., chats, blogs, wiki®, Facebook®, Linkedin®, twitter®, foursquare®, and mobile applications). Pop-up advertisements currently experienced by users on line are considered distractions and disruptions, because although the pop-up may be related to the user, the pop-up is unlikely to be related to what the user is doing.

Today, commerce may be conducted on websites by a user navigating to a company's social forum web page (e.g., the GAP's® Facebook® page) to purchase a product and/or service from the company. A user may have the ability to purchase products from a particular company through the social forum by going to the webpage of the company within the social forum. However, in order for the user to purchase a particular product the user is directed to a particular physical or digital space to complete a transaction, away from the user's current interaction (e.g., dialogue with another user). A user may interrupt a current interaction and/or context to go to a physical store or a dedicated online store (e.g., website) in order to make purchases of goods and services. The physical and online stores tend to be divorced from the conversations and interactions occurring within the social forums. Regardless of whether an advertisement campaign is being used by a company for a new or existing brand or product, or whether a user's friend is communicating information to the user about the company, brand, or product (e.g., a new watch your friend purchased), the user currently leaves the social forum or at some future point in time the user may go to the physical store or navigate to the online store to acquire additional information, initiate and complete the purchase of the product mentioned by advertisements and/or the user's friend.

SUMMARY

The social in line consumer interaction launch pad ("launch pad") allows companies to initiate interactions (e.g., receive information, customer relationship management interactions and/or purchases) with users (e.g., existing customers and potential new customers) without the users having to go to the physical store or navigate to the online store, and without the user having to leave the user's current location (e.g., digital location), during an interaction (e.g., conversation) in the social forum.

The launch pad provides a system and method that includes a display device with a graphical user interface responsive to a user input device, and a communication interface in communication with a network (e.g., an internet). The system also includes a memory coupled to a computer processor. The memory includes launch pad logic executable by the processor that when executed by the processor receives input from a user identified by a user profile. The input may include free form text, graphical information and audio inputs from the user. The launch pad logic determines whether the input (e.g., free form text, graphical information—selecting an image having metadata describing the image, and audio inputs—speech recognition) includes a name of a company, a brand, or a product and/or service.

The launch pad logic determines whether the user profile satisfies a user interest threshold that identifies whether the user is interested (e.g., positively interested or negatively interested) and how interested or disinterested the user may be in the company, the brand, or the product and/or service. The launch pad logic may use the user interest threshold to determine whether a service (e.g., an interaction, customer relationship management (CRM) interaction, information about and/or a transaction with a particular company, brand, or product and/or service) is available to present to the user. The user profile may satisfy the user interest threshold because of a positive interest (e.g., loyal and/or repeat customer to a company, a brand, and/or a product) or negative interest (e.g. complaining about a company, a brand, and/or a product) expressed by the user through user preferences and/or user input analyzed by the launch pad.

The launch pad logic tags a portion of the input when the portion of the input identifies a predetermined context directed to the company, the brand, and/or the product. The tagged portion of the input may include a selectable highlighted hypertext link that launches an interaction-transaction interface when the user profile satisfies the user interest threshold, and the highlighted hypertext link is selected, or when a user input device or an icon associated therewith is positioned over a portion of the highlighted hypertext link. The information and/or options presented (e.g., by the interaction-transaction interface) may depend on the identified context for the portion of the input and the user interest threshold. The information and/or options presented may depend on whether the company has paid for the company's brand(s) and/or product(s) to be affiliated with and/or triggered by the use of the launch pad. The interaction-transaction interface may include selectable information to view about the company, the brand, or the product, and/or selectable options to initiate CRM interaction(s) and/or to purchase a product.

The launch pad logic may use the user profile and the social forum user analytics to determine a user type for the user. The launch pad logic may use the user type, and the portion of the input to determine whether and what information (e.g., auto complete content) to use to perform auto complete functions for the user while the user is inputting the user input. The launch pad logic may also use the user device (e.g., desktop, laptop, mobile communications device, tablet computing device) to also determine whether and what information to present to the user in order to accommodate the size of the interface, and/or capability of the user device, and convenience of the user.

The launch pad may use a social forum policy rules identifier to identify rules, policies and/or procedures of social forums (e.g., privacy information rules) that determine the functionality usable to implement and operate the interaction-transaction interface in the social forums, where the interaction-transaction interface is configured. The launch pad logic may also identify authorized payment methods, according to the social forum policy rules identifier, to use to purchase product (e.g., social forum native currency). The launch pad logic may complete a transaction according to at least one of the authorized payment methods, including using social forum native currency, and/or convert credits in the social forum native currency to user selectable credits usable outside the social forum.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The social in line consumer interaction launch pad ("launch pad") may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2 shows a web browser with the launch pad browser plug-in.

FIG. 3 shows logic the launch pad may use to determine whether to present the user an interaction transaction interface.

FIG. 5 shows a memory with components used by the launch pad.

DETAILED DESCRIPTION

Figure 1:
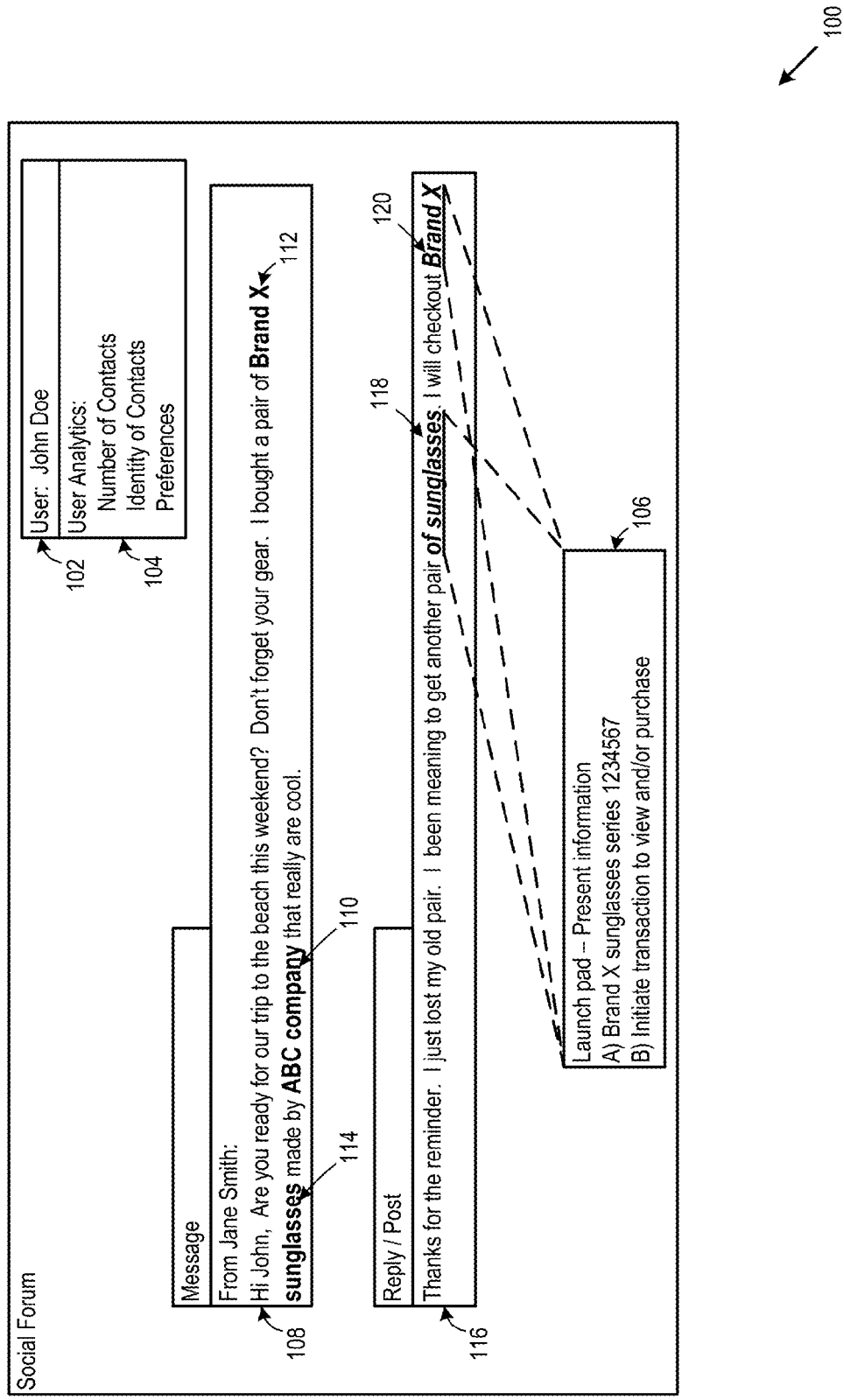
FIG. 1 shows a social forum interface implemented with a social in line consumer interaction launch pad ("launch pad") for user interaction.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different or fewer components may be provided.

The social in line consumer interaction launch pad allows companies to create interactions (e.g., customer relationship management interactions, deliver information, and/or initiates purchases) with users (e.g., existing customers and potential new customers) without users having to navigate to the physical or online store, and without the user having to leave the user's current location (e.g., digital location), during an interaction (e.g., conversation) in the social forum. The user may be engaged by the company in line with what the user is already doing in the social forum. The launch pad provides a new starting point and/or interaction point for users (e.g., consumers and what the consumer is attempting to accomplish are embedded in the social forum the user is currently using). For example, while the user is in a social forum (e.g., Facebook®) engaged in an interaction (e.g., a conversation with another user) where the user asks another user what's the dress code for an interview at Google®, because the interview may not be a suit appropriate situation, the user may receive a reply suggestion to where a pair of khaki pants and the suggestor may mention that the suggestor bought a particular brand of khakis from company X last week on sale.

The launch pad analyzes typical casual normal conversations engaged in by users across the web sphere. The social in line consumer interaction launch pad converts interactions between the user and other entities (e.g., other users, and entities other than a company selling a particular brand or product and/or service) into opportunities to be presented with information, CRM interactions (e.g., customer service campaigns) and/or ability to purchase products. The launch pad automatically detects when the user interaction is about a particular company, product, service, and/or brand, and gives the user the ability, within the social forum, to perform actions and/or purchase products. Instead of the user taking note of the suggestion to investigate and/or purchase from the company's physical or online store at a later time, the launch pad provides the user a way to initiate and complete an investigation, initiate a CRM interaction and/or purchase a product without leaving the social forum.

The launch pad determines who of the user's contacts (e.g., friends) has purchased a particular brand or product, what type of deals are currently available for the brand or product, what are the current reviews and trends for the brand or product, and provide a way to purchase the product in line with the user's interaction in the social forum. The launch pad creates a more natural and more social starting point for the user to acquire information about the company, brand, and/or product, and/or purchase product without leaving the social forum.

The launch pad may be implemented by a third-party (e.g., marketing service) rather than the company of the brand and/or product, or the launch pad may be implemented by the social forum directly, or in some instances the company of the brand or product may implement the launch pad in the social forum. The launch pad may be implemented by the third-party in collaboration with the social forum in order to impose the launch pad for use by the users of the social forum. The social in line consumer interaction launch pad may provide an auto complete (e.g., type ahead) functionality.

The launch pad may be implemented using an application program interface (API) and/or a web browser plug-in. The launch pad analyzes the input (e.g., free form text, graphical information, audio input) entered by the user to determine the context of the user interaction and based on the context the launch pad tags particular portions of the input. In addition to using the context, the launch pad may use other criteria (e.g., user preferences configured by the user or automatically by the launch pad using the user's profile and/or user analytics) to determine whether to tag particular portions of the input. The tagged portions of the user input may be highlighted and/or hyperlinked and selectable by the user to initiate the launch pad interaction-transaction interface.

The launch pad may auto complete text (e.g., and type ahead) user input. For example, when a user's input (e.g., free form text, a picture of the new clothes the user purchased, or an audio message that describes the product(s) purchased) identifies that the user purchased a pair of sunglasses of a particular brand, the launch pad provides an option to select the model number and/or the series of the pair of sunglasses to include in the input. The launch pad recognizes the company, the user (e.g. consumer), and uses this information to determine what to present to the user for selection. The additional information may be socially related to the user or users (e.g., the user's contacts) within the user's social network that reviewed the product and/or brand. The launch pad determines what the user wants to do in relation to a company, a brand, and/or a product, when a user interaction (e.g., conversation, post, blog) refers to a company, brand, and/or product, rather than the user withdrawing from the conversation in order to navigate to another environment to collect information about or purchase the product.

The social in line consumer interaction launch pad may be implemented as a web browser plug-in with the same, more or different functionality and purposes as those for the launch pad implemented in the social forum through an API. For example, the launch pad implemented as a browser plug-in may be used during a user session on a product review site (e.g., consumer reports®) where the user is researching to make a decision regarding whether to purchase a particular product. During the user's interaction with the reviews, the launch pad logic may determine the context of the user's search and determine whether the user intends to purchase the product and/or whether the user merely desires to browse because of general interest. The logic may determine (e.g., using the user's current interactions, user analytics, and/or user profile) the user's intended time frame to purchase how soon the user intends to purchase (e.g., within the next few minutes, hours, days).

The launch pad implemented in a social forum (e.g., Facebook®) rather than as a browser plug-in, takes advantage of the user's connection to the social forum and the user analytics gathered about the user from the user analytics of the social forum in order to determine the features (e.g., brands, products, reviews, commerce transactions) presented to the user via the launch pad. For example, a celebrity advertising that other people should drink a particular sports drink may be compelling. However, if the user has contacts (e.g., one or more other user's that are determined to be an influencer—captain of the high school football team) in the social forum that have used or suggest using the product, then the user may be more compelled to research and/or purchase the product. Implementing the launch pad in a social forum where the launch pad has access to the user's analytics enables the launch pad to identify the website the user is using, and what the user is doing on the website so that the launch pad may relate that information to a particular brand and/or product to present to the user. Implementing the launch pad in a social forum allows the launch pad to identify the context in which the user is interacting with others and/or the social forum.

The launch pad uses an adaptive lexicon (e.g., aggregate information trending on the internet and/or on one or more social forums) in order to determine the context of the conversation to accurately confirm that an interaction and/or conversation is directed to a particular company, brand and/or product. The launch pad provides auto complete of input (e.g., free form text and/or audio input) for the user to use.

For example, an event showcasing different brands and products from different companies may be trending on the Internet so that blogs, posts, and various other means of communication mention the event, and the different brands and products from the different companies. A person interested in the showcased different brands and products may search the Internet and/or discuss the user's interests in a brand and/or product (e.g., the launch pad browser plug-in may assist the user's search). Conversations between users about the various brands and products may be assisted by the launch pad (e.g., using the launch pad social forum API implementation) providing the users with automated means to receive additional information about the brands and/or products without the user leaving the interaction and/or conversation. When the user posts a comment and/or a reply that includes context that refers to a particular product and/or brand, the launch pad includes selectable highlighted hypertext linked portion of the free form text so that the user and/or another user viewing the comment and/or reply may select the highlighted hypertext linked portion of the free form text. Using the launch pad, the user may receive services without leaving their current interaction. The launch pad may present the user services and/or information such as where the brand and/or product is being sold, how much the products are being sold for, and how many of the users of friends or contacts or other people interested in the brand or product have similar interests in the product and/or brand and have purchased the product and/or brand. The launch pad allows the user to use a pointing device and/or hover over selectable highlighted hypertext linked portion of the free form text to receive additional services. The launch pad essentially allows the user to perform research, and when desired purchase a product automatically in the course of the user's interactions and conversations, without leaving the interaction and/or conversation. In addition, a user viewing a post by another user (e.g., a post by another user considered an influencer) may select the highlighted hypertext linked portion and immediately purchase the product as a result of simply viewing the post.

The launch pad may perform semantic word comparisons to determine the context in which the company, brand, and/or product is used in a conversation (e.g., interaction). The launch pad takes into account the user's use of abbreviations and slang (e.g., Rolex® referred to as Roley). The launch pad enables inline auto complete of metadata for the company, the brand, and the product in the portion of the input identifying the company, the brand, or the product. The metadata associated with the highlighted hypertext-text link of the portion of the input (e.g., free form text) is accessible by the viewer (e.g., recipient or viewer of the post).

The launch pad also learns from user interactions with the launch pad, and selections of the highlighted hypertext-text link of the portion of the input (e.g., free form text) so that over time the logic adapts and refines to more accurately identify user preferences and more variations of user types (e.g., identify more target groups of users—smaller, more granular marketing targets), accurate context, and appropriate information to present in the interaction-transaction interface of the launch pad. The launch pad may aggregate the users' selections of information presented in the interaction-transaction interface of users using the launch pad application, in order to improve the services presented to the users of the launch pad. Accordingly, when the user has a number of friends or contacts that have a particular product or use a particular brand, the launch pad, rather than merely present information, may present information indicating how many of the user's friends or contacts have the particular product or use the particular brand as a means to provide a more compelling reason for the user to also purchase the particular product or brand. Conversely, when few of the user's friends or contacts use the particular brand or product, the launch pad may only provide information and/or consider the user as unlikely to be interested in the brand or product, and accordingly, present little information in the launch pad regarding the brand or product.

The launch pad may provide particular deals and promotions, and/or better deals and promotions to a user who has a large number of friends and/or contacts (e.g., 10,000 contacts) regardless of whether the user's contacts and/or friends have or use the brand and/or product, because the launch pad may consider a user with a particular number of contacts and/or friends as an influencer. The launch pad may consider a user a viable advocate for a product and/or brand and adapt accordingly.

The users may be identified by any number of user types including the squeaky wheel (e.g., the complainer) where the launch pad, in order to convert the user to a happy customer, in addition to product and brand information, may present a gold plated customer service contact method to address the user's issues with the brand and/or product). The influencer user type may be identified by the number of contacts and/or friends, the number of posts, and/or the frequency of use by a user of the social forum.

The launch pad logic determines whether the user is in the course of actually purchasing a particular brand or product, and/or merely chatting or surfing the web (e.g., Internet) with no intention to purchase a particular brand or product. For example, a user with the intention to purchase a particular brand or product may interact and input free-form text inquiring about the specifications for a particular product, the cost and locations to purchase the product.

The personalized expert model used in marketing relies on consumers accepting the expert's recommendation regarding a particular brand or product. For example, a world-class champion uses a particular piece of equipment and mentions the same in an advertisement is highly suggestive to consumers interested in purchasing similar equipment. However, using the expert model approach is very limited because an individual consumer doesn't necessarily have a direct contact with that expert. In contrast, an influencer (e.g., a user with a large number of followers, friends and/or contacts, or a user with few but key contacts) may have greater influence on the user's followers, friends and/or contacts. For example, the captain of the high school football team with a large following of friends and contacts on the social forum, may use a particular product and/or brand, and the launch pad may considered the captain of the high school football team a greater influencer to the friends and contacts than a professional football player.

Marketers may use the follow-the-crowd model that relies on consumers' desire to fit in and/or be popular. However, given the number of products and brands available online, the number of products vying for the user's attention is so many that knowing what's popular and trending is difficult for companies to determine early enough in order to fully take advantage of the trend. The launch pad provides a way to identify trends for individual users on a personal level, by leveraging the user's social network (e.g., how many of your friends, your family, and/or your contacts like a particular brand or product) and user analytics gathered from the social forum as well as various other sources on the Internet.

The launch pad provides a way to identify trends occurring for smaller communities (e.g., more granular consumer targeting) and market to those communities (e.g., smaller targeted marketing campaigns), rather than developing a campaign around larger groups of potential consumers. The launch pad provides a way to create and manage multiple varying campaigns (e.g., broad and narrow groups). The launch pad may take advantage of a dynamically adjusted rule hierarchy (e.g., adaptive model and/or statistical model (s)) that adjusts based information gathered as a result of actual use by users of the launch pad, so that the right information is presented to the user that makes using the launch pad more compelling for the users. For example, the launch pad may not present a buy option for every user to purchase a product because based on context information the launch pad understands that the user may not always be interested in making a purchase. The launch pad adaptively determines what information and options to present to the user based upon which of various social forums (e.g., what website the user is on) the user may be using at the time.

FIG. 1 shows a social forum interface 100 implemented with a social in line consumer interaction launch pad ("launch pad") for user interaction. The launch pad may access social forum policy rules of the social forum interface 100 to determine whether the launch pad may access and use the user profile 102 and user analytics 104 (e.g., number of contacts, identity of contacts, and contacts and/or user's preferences and previous interactions) from the social forum to implement and operate an interaction-transaction interface 106. The launch pad interaction-transaction interface 106 is a digital commerce service implemented as a plug-in to a web browser, or integrated, using an application programming interface (API), into application logic of social forums accessible using the Internet, where users view reviews, post comments, and interact in chat rooms and/or communication threads with other users of the social forum. The interaction-transaction interface 106 allows users to view company, brand, and product information and/or perform commerce functions without leaving the social forum interface 100.

The launch pad may aggregate results of user analytics of previous user interactions (e.g., the users on the social forum, users connected to the Internet, and/or the user of the launch pad and the user's friends and contacts) to determine whether the user profile satisfies the user interest threshold. Satisfying the user interest threshold may indicate a likelihood that the user is interested in purchasing a brand, and/or a product, and/or merely interested in information about the brand, and/or the product. The user profile may satisfy the user interest threshold because of a positive interest (e.g., loyal and/or repeat customer to a company, a brand, and/or a product) or negative interest (e.g. complaining about a company, a brand, and/or a product) expressed by the user through user preferences and/or user input analyzed by the launch pad. For example, the user maybe positively interested or negatively interested in a company, a brand, and/or a product. The launch pad logic may use the user interest threshold to determine whether a service (e.g., an interaction, customer relationship management (CRM) interaction, information about and/or a transaction with a particular company, brand, or product) is available to present to the user. For example, a user using a social forum interface 100 implemented with the social in line consumer interaction launch pad ("launch pad") may receive a message 108 from a contact or view a post from a contact (e.g., friend) that includes references to a company 110, brand 112, or product 114.

The launch pad may tag portions (e.g., generate selectable highlighted hypertext links) of free form text (e.g., posts, blogs, messages, and replies) as selectable highlighted hypertext links (e.g., 110, 112, 114) when a predetermined context is determined that identifies words or phrases as relevant to the user (e.g., viewer). When the user inputs a post and/or reply 116 (e.g., free form text), the launch pad may auto complete and/or provide the user the option to auto complete the input with information about the company 110, brand 112, and product 114 referred to by the input. For example, the user may begin inputting a reply to a review, message or post and the launch pad determines that the user is inputting the company 110, brand 112, and/or product 114 and auto complete the input or present the interaction-transaction interface 106 where the user may select information from the interaction-transaction interface 106 to auto complete and/or provide the user the option to auto complete the input (118, 120). In this way, the user may access information about a company 110, brand 112, or product 114, and/or perform a commerce function directed to the company 110, brand 112, and/or product 114 in the natural course of interacting with the social forum.

Figure 2:
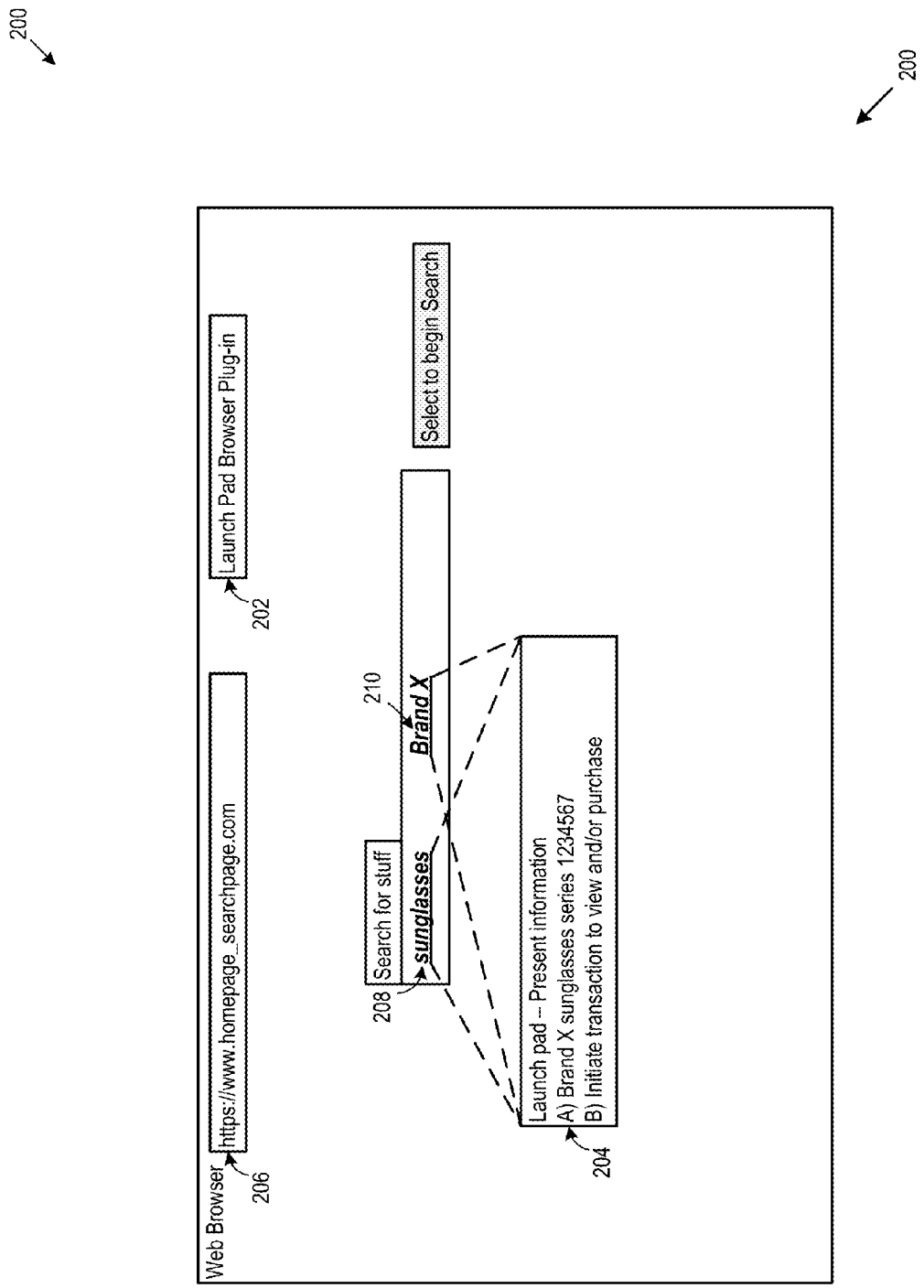

FIG. 2 shows a web browser 200 with the launch pad browser plug-in 202. The user may download the launch pad browser plug-in 202 onto the user's device (e.g., desktop, laptop, mobile communications device, tablet computing device) and install the launch pad browser plug-in 202 for use with the user's browser. When the user installs the launch pad browser plug-in 202, the user may identify one or more social forums memberships and user preferences for use with the launch pad, and the launch pad browser plug-in 202 may access the user's user profile and/or user analytics from the identified one or more social forums memberships in order to determine how to interact with the user and the information to provide when generating the interaction-transaction interface 204 during the browser session.

For example, the user may initiate and/or navigate to a homepage or search page 206 to search for a particular company, brand and/or product. The launch pad may auto complete and/or provide the user the option to auto complete the input (208, 210) with information about the company 110, brand 112, and product 114 referred to by the input. In this way the user does not have to leave the current browser area (e.g., start another browser session, or even complete a browser search before receiving information and/or perform commerce functions) to acquire relevant information and/or perform commerce functions related to a particular company, brand and/or product.

FIG. 3 shows logic 300 the social in line consumer interaction launch pad may use to determine whether to present the user an interaction transaction interface. The launch pad logic analyzes the input (e.g., free form text, graphical information, audio input) by the user and the user profile of the user (302). The launch pad logic determines whether the input identifies the name of a company, a brand, and/or a product (304). The launch pad logic identifies predetermined context by analyzing the user input (306). The launch pad logic tags a portion of the input as a selectable highlighted hypertext link when a predetermined context is identified (308). When the user selects (e.g., using the user's finger on a touch screen device or audio command) or uses a pointing device to hover over (e.g., mouse over) (310), the launch pad logic determines whether the user profile satisfies a user interest threshold (312). The launch pad logic analyzes and/or determines (e.g., develops) the user profile in the event a user profile is unavailable to the launch pad from the social forum or another source. The user interest threshold may indicate the likelihood that the user is interested in purchasing a brand, and/or a product, and/or merely interested in information about the brand, and/or the product. The launch pad logic may determine whether the user profile satisfies the user interest threshold by using the user's profile and/or user analytics. The launch pad logic generates an interaction-transaction interface depending on the identified predetermined context, and/or the user's profile and user analytics (314). The launch pad logic may generate the interaction-transaction interface and the content presented by the interaction-transaction interface depending on the services (e.g., an interaction, customer relationship management (CRM) interaction, information about and/or a transaction with a particular company, brand, or product) available to present to the user. For example, the launch pad may tag a brand X and/or product Y from company Z, but the launch pad may not present services and/or content for brand X and/or product Y from company Z because of user preferences (e.g., the companies, brands, and/or products the user does and/or does not desire to receive information and/or initiate interactions with). The launch pad may also not present services and/or content for brand X and/or product Y from company Z because the brand X and/or product Y from company Z is/are not configured for use by the launch pad to initiate the interaction-transaction interface (e.g., because company Z has not paid to be affiliated with or trigger the launch pad). The user may also indicate preferences to the launch pad regarding communication (e.g., phone call, email, multimedia, and/or physical mail) with the user and how the user desires to receive information about brand X and/or product Y from company Z. The launch pad logic uses the user's preferences regarding how the user is to receive information to initiate interactions with the user and deliver services and information to the user. The launch pad logic may use the user's preferences and/or user analytics to determine the services presented by the interaction-transaction interface and/or whether to present the interaction-transaction interface to the user, and how to deliver information to the user.

The launch pad logic identifies the user's device type (e.g., mobile device, desktop/laptop, and tablet) to determine the type and amount of information to present in the interaction-transaction interface to accommodate the device type used by the user (316). The user may use multiple devices and the launch pad logic adapts to the user's device type and the user's preferences so that as the user uses different devices the launch pad logic recognizes the device the user is using and the type and amount of information to present in the interaction-transaction interface to accommodate the device type used by the user. The launch pad logic launches the interaction-transaction interface based on the identified predetermined context, user profile and/or the user's device type (318). The predetermined context may be based on the user's social network, the social forum the user is using, or the result of analyzing an aggregate of information trending on the Internet, or any combination thereof.

Figure 4:
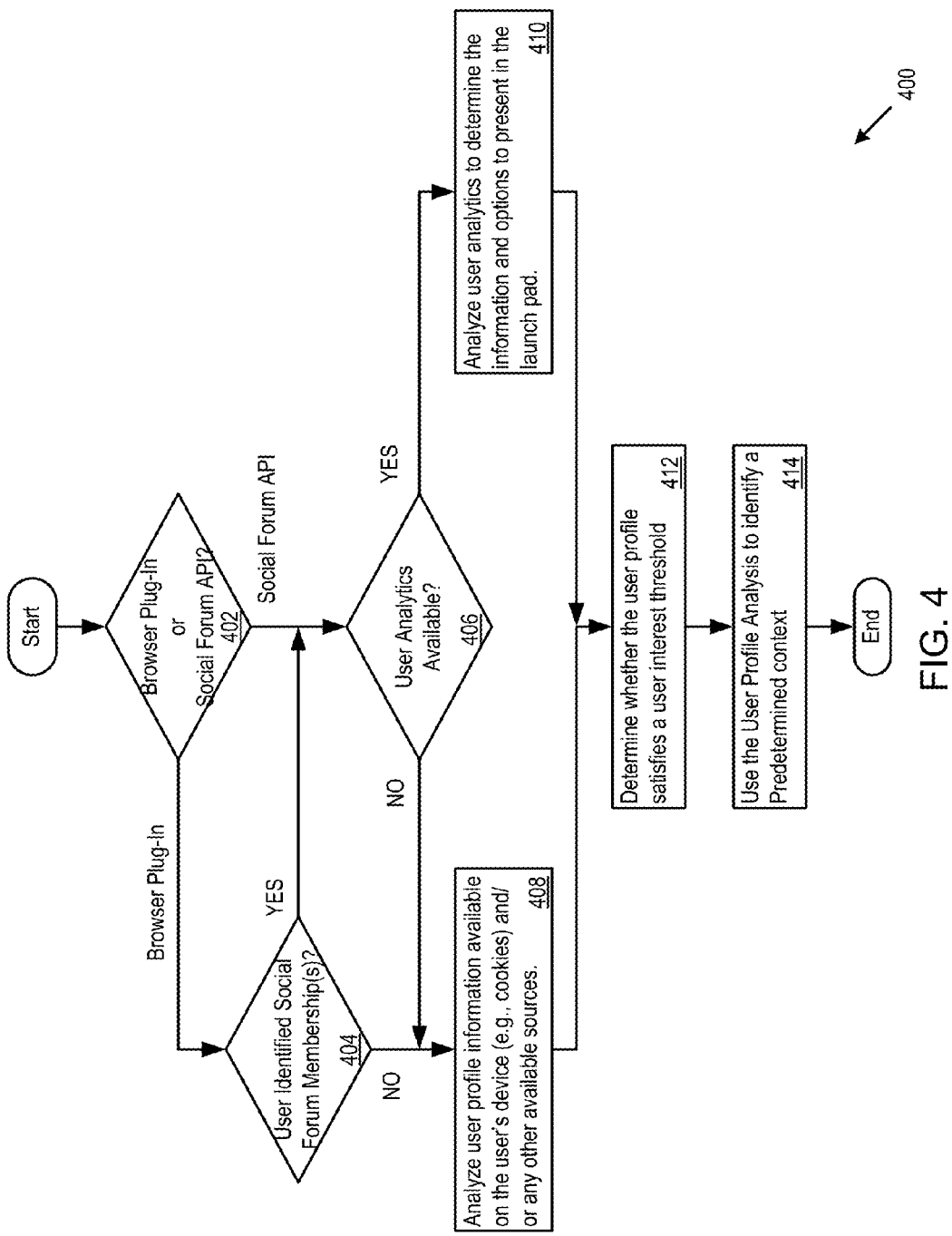
FIG. 4 shows logic the launch pad may use to determine and/or access available user analytics to use.

FIG. 4 shows logic 400 the social in line consumer interaction launch pad may use to determine (e.g., calculate) and/or access available user analytics to use. The launch pad may use the user analytics to identify whether the user's profile satisfies the user interest threshold. The launch pad determines whether the user is using the launch pad implemented as a browser plug-in or using a social forum API implementation (402). The user may identify one or more social forum membership(s) when the user installs the launch pad as a browser plug-in. The launch pad logic may automatically detect whether the launch pad is implemented for use in a social forum using an API. When the launch pad determines that the launch pad used by the user is implemented as a browser plug-in, the launch pad determines whether the user identified one or more social forum memberships (404). When the user has identified one or more social forum memberships, the launch pad evaluates the social forum policy rules of the social forum membership(s) identified in order to determine whether the user's analytics (e.g., user's profile, user's friends and/or contacts, user's interests and previous interactions) are available (406). When the social forum policy rules for the identified one or more social forum memberships does not allow the launch pad to access the user's analytics, the launch pad analyzes the user profile information available on the user's device (e.g., cookies) and/or any other available sources in order to calculate and/or determine the user's analytics (408). When the social forum policy rules for the identified one or more social forum memberships does allow the launch pad to access the user's analytics, the launch pad may also analyze the user profile information available on the user's device and/or any other available sources in order to calculate and/or determine the user's analytics. The launch pad logic uses the user analytics available to determine the information and options to present in the launch pad, when the social forum policy rules for the identified one or more social forum memberships allow the launch pad to access the user's analytics (410). Once the launch pad logic calculates and/or determines, or accesses the user's analytics, the launch pad determines whether the user profile satisfies a user interest threshold (412), and uses the user profile analysis, and the predetermined context to use to determine the information to present in the interaction-transaction interface (414).

FIG. 5 shows a component 500 of the system for the social in line consumer interaction launch pad ("launch pad"). The system includes at least one computer readable memory 502 used to provide the digital commerce services of the launch pad. The memory 502 may include launch pad logic 504 executable by a processor that when executed by the processor receives input 506 from a user identified by a user profile 508. The input 506 may include, in addition to free form text, graphical information and audio inputs from the user. The launch pad logic 504 determines whether the input (e.g., free form text) includes a name of a company, a brand, or a product. The launch pad logic 504 also determines whether the user profile 508 satisfies a user interest threshold 510 that identifies that the user is interested in the company, the brand, or the product. The launch pad logic 504 tags a portion of the input 512 when the portion of the input 512 identifies a predetermined context 514 for the portion of the input 512 as directed to the company, the brand, or the product. The launch pad logic 504 may be configured to also tag a portion of the input 512 when the portion of the input 512 and the user interest threshold 510 identifies a predetermined context 514. The tagged portion of the input 512 may include a selectable highlighted hypertext link that launches an interaction-transaction interface 516 when the highlighted hypertext link is selected, when a user input device, or an icon associated therewith is positioned over a portion of the highlighted hypertext link. The information and/or options presented (by the interaction-transaction interface 516) may depend on the user interest threshold 510 and/or the identified context 514 for the portion of the input 512. The interaction-transaction interface 516 may include selectable information to view 518 about the company, the brand, or the product, and/or selectable options to initiate a CRM interaction and/or purchase of a product 520. The launch pad logic 504 may use the user profile 508 and the social forum user analytics 522 to determine a user type 524 for the user. The launch pad logic 504 may use the user type 524, and the portion of the input 512 to determine whether and what information to use (e.g., auto complete content 526) to perform auto complete functions for the user while the user is inputting the user input 506. The user type 524 may include an advocate (e.g., considered advocate for the company, brand, and/or product and/or service), influencer of others, a preferred user (e.g., of the social forum, and/or the company, brand, and/or product), potential first time purchaser, and a dissatisfied user (e.g., dissatisfied with the company, brand, and/or product). The launch pad logic 504 may calculate, based on the user type 524 loyalty/advocate points, redeemable to purchase products and/or services. The launch pad logic 504 may determine, based on the user type, deals/incentives to provide to the user based on the user profile, the portion of the input identifying for the company, the brand, or the product, or a combination thereof. The launch pad logic 504 may use the user device 528 (e.g., desktop, laptop, mobile communications device, tablet computing device) to also determine whether and what information to present to the user in order to accommodate the size of the interface, and/or capability of the user device 528. The launch pad may use a social forum policy rules identifier 530 to identify rules, policies and/or procedures of social forums that determine the functionality usable to implement and operate the interaction-transaction interface 516 in the social forums, where the interaction-transaction interface 516 is configured. The launch pad logic 504 may also identify authorized payment methods, according to the social forum policy rules identifier 530, to use to purchase product. The launch pad logic 504 may complete a transaction according to at least one of the authorized payment methods, including using social forum native currency 532, and/or convert credits in the social forum native currency 532 to user selectable credits 534 usable outside the social forum. The launch pad logic may determine the composition of the interaction-transaction interface, depending on the identified context for the portion of the input, the user profile, a geographical location of the user, the display device, or any combination thereof. The interaction-transaction interface may include selectable information to view about the company, the brand, or the product and/or service, selectable option to purchase the product and/or service, or a combination thereof.

Figure 6:
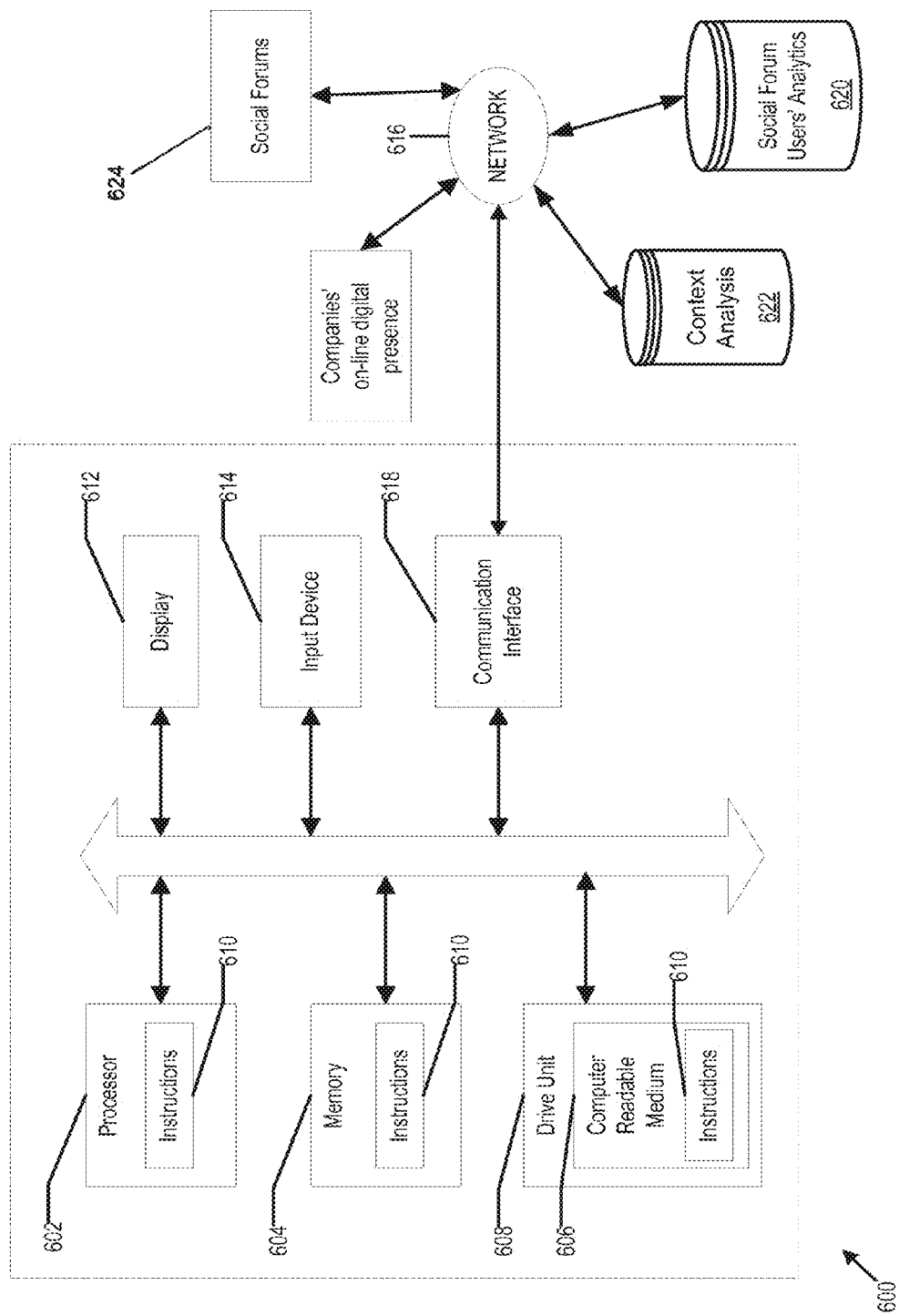
FIG. 6 shows a system configuration of the launch pad.

FIG. 6 shows a system configuration 600 of the launch pad. The system may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 610 (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 602, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory 604 that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data (e.g., context analysis 620 and social forum users' analytics 622 used to refine the launch pad logic determination of what the user may desire to view and/or select in the interaction-transaction interface of the launch pad). Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The computer system may further include a display 612, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device 614 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit 608. The disk drive unit may include a computer-readable medium 606 in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network 616 may communicate voice, video, audio, images or any other data over the network. Further, the instructions may be transmitted or received over the network via a communication interface 618. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

I claim:

1. A system, comprising:
a display device comprising a graphical user interface responsive to a user input device;
a processor;
a memory coupled to the processor, the memory comprising logic executable by the processor that when executed by the processor:
receives input via the graphical user interface from a user during the user's interaction in a social forum that is accessible via the Internet, the user identified by a user profile stored in the memory, wherein the input comprises free form text that is displayed on the display device;
determines whether the free form text input includes a name of a company, a brand, or a product;
determines whether a positive or negative interest indicated in the user profile satisfies a user interest threshold, where the positive or negative interest indicated in the user profile is based on user preferences input by the user and indicates whether the user is interested in the company, the brand, or the product of the free form text input;
tags a portion of the free form text input in instances when the portion of the free form text input and the user interest threshold identify a predetermined context for the portion of the free form text input as directed to the company, the brand, or the product, wherein the tags a portion of the free form text input comprises adding a selectable highlighted hypertext link to the free form text input that is displayed on the display device;
launches an interaction-transaction interface when the highlighted hypertext link of the displayed free form text input is selected, the selection occurring when a user input device, or an icon associated therewith, is positioned over a portion of the highlighted hypertext link of the displayed free form text input, wherein the interaction-transaction interface allows users to perform commerce functions from within the social forum; and
depending on the predetermined context for the portion of the free form text input and a geographical location of the user, the interaction-transaction interface comprises:
selectable information to view about the company, the brand, or the product;
selectable option to purchase the product; or
a combination thereof; and
wherein the logic when executed by the processor further:
determines authorized payment methods to purchase products using the interaction-transaction interface in the social forum, according to a social forum policy rules identifier that identifies rules, policies and procedures of the social forums, wherein the rules, policies and procedures determine functionality for implementing and operating the interaction-transaction interface in the social forum;
completes a transaction according to at least one of the authorized payment methods, the payment methods including:
a method using currency native to the social forum; and
a method that converts credit in the currency native to the social forum to user selectable credits usable outside the social forum.

2. The system of claim 1, wherein the interaction-transaction interface is a digital commerce service implemented as a plug-in to a web browser, or integrated, using an application programming interface (API), into application logic used for the social forum, wherein the social forum is accessible using the internet, and is used by users to view reviews and interact with chat rooms and other users of the social forum.

3. The system of claim 1, wherein the logic when executed by the processor further:
aggregates results of analytics of previous user interactions on the social forum to determine whether the user profile satisfies the user interest threshold.

4. The system of claim 1, wherein the logic when executed by the processor further:

performs inline auto complete of metadata for the company, the brand, or the product in the portion of the input that identifies the company, the brand, or the product.

5. The system of claim 1, wherein the logic when executed by the processor further:
identifies a user type for the user from user types including: an advocate; an influencer; a preferred user; and a dissatisfied user;
calculates, based on the identified user type for the user, loyalty or advocate points; and
determines, based on the identified user type for the user, deals or incentives to provide to the user based on the user profile, the portion of the free form text input including the company, the brand, or the product, or a combination thereof.

6. The system of claim 1, wherein depending on the predetermined context for the portion of the input, the user profile, a geographical location of the user, the display device, or any combination thereof, the interaction-transaction interface comprises:
selectable information to view about the company, the brand, or the product;
selectable option to purchase the product; or
a combination thereof.

7. A method, comprising:
receiving, through a network comprising an internet, input from a user during the user's interaction in a social forum, the user identified by a user profile, wherein the input comprises free form text viewable on a display device;
determining whether the free form text input includes a name of a company, a brand, or a product;
determining whether a positive or negative interest indicated in the user profile satisfies a user interest threshold, where the positive or negative interest indicated in the user profile indicates whether the user is interested in the company, the brand, or the product;
tagging a portion of the free form text input in instances when the portion of the free form text input and the user interest threshold identify a predetermined context for the portion of the free form text input as directed to the company, the brand, or the product, and wherein the tagging a portion of the free form text input comprises adding a selectable highlighted hypertext link to the free form text input that is viewable on the display device;
launching an interaction-transaction interface when the highlighted hypertext link of the portion of the free form text input that is viewable on the display device is selected, the selection occurring when a user input device or an icon associated therewith is positioned over a portion of the highlighted hypertext link of the portion of the free form text input that is viewable on the display device;
depending on the predetermined context for the portion of the free form text input and a geographical location of the user, generating the interaction-transaction interface to comprise:
selectable information to view about the company, the brand, or the product;
selectable option to purchase the product; or
a combination thereof; and
determining whether a positive or negative interest indicated in the user profile satisfies a user interest threshold, where the positive or negative interest indicated in the user profile indicates whether the user is interested in the company, the brand, or the product of the free form text and where the positive or negative interest in the user profile is based on user preferences input by a user, or based on analysis of a user's input by the logic when executed by the processor;
determining authorized payment methods to purchase products using the interaction-transaction interface in the social forum, according to a social forum policy rules identifier; and
completing a transaction according to at least one of the authorized payment methods, the payment methods including:
a method using currency native to the social forum; and
a method for converting credit in the currency native to the social forum to user selectable credits usable outside the social forum.

8. The method of claim 7 further comprising:
configuring the interaction-transaction interface using the social forum policy rules identifier, wherein the rules determine the functionality usable to implement and operate the interaction-transaction interface in the social forum.

9. The method of claim 7, wherein the interaction-transaction interface is a digital commerce service implemented as a plug-in to a web browser, or integrated, using an application programming interface (API), into application logic used for social forums, wherein the social forums are accessible using the internet and are used by users to view reviews and interact with chat rooms and other users of the social forums; and
wherein the interaction-transaction interface allows users to perform commerce functions within the social forums.

10. The method of claim 7, further comprising:
aggregating results of analytics of previous user interactions on the social forum to determine whether the positive or negative interest indicated in the user profile satisfies the user interest threshold.

11. The method of claim 7, further comprising:
performing inline auto complete of metadata for the company, the brand, or the product in the portion in the portion of the input that identifies the company, the brand, or the product.

12. The method of claim 7, further comprising:
identifying a user type for the user from user types including: an advocate, influencer; preferred user; and dissatisfied user;
calculating, based on the identified user type for the user, loyalty or advocate points; and
determining, based on the identified user type for the user, deals or incentives to provide to the user based on the user profile, the portion of the free form text input including the company, the brand, or the product, or a combination thereof.

13. The method of claim 7, wherein depending on the predetermined context for the portion of the free form text input, the user profile, a geographical location of the user, the display device, or any combination thereof, the interaction-transaction interface comprises:
selectable information to view about the company, the brand, or the product;
selectable option to purchase the product; or
a combination thereof.

14. The method of claim 7,
wherein the display device comprises a graphical user interface responsive to a user input device; and wherein the display device further comprises the interaction-transaction interface.

15. A system, comprising:
a display device comprising a graphical user interface responsive to a user input device;
a processor;
a memory coupled to the processor, the memory comprising logic executable by the processor that when executed by the processor:
receives input from a user identified by a user profile during the user's interaction in a social forum, wherein the input comprises free form text viewable on a display device;
determines whether the free form text input viewable on a display device includes a name of a company, a brand, or a product;
determines whether a positive or negative interest indicated in the user profile satisfies a user interest threshold where the positive or negative interest indicated in the user profile indicates whether the user is interested in the company, the brand, or the product;
tags a portion of the free form text input viewable on the display device in instances when the portion of the free form text input viewable on the display device and the user interest threshold identify a predetermined context for the portion of the free form text input viewable on the display device as directed to the company, the brand, or the product, and wherein the tags a portion of the free form text input viewable on the display device comprises adding a selectable highlighted hypertext link to the free form text input viewable on the display device;
launches an interaction-transaction interface when the highlighted hypertext link of the free form text input viewable on the display device is selected, the selection occurring when a user input device or an icon associated therewith is positioned over a portion of the highlighted hypertext link free form text input viewable on the display device; and
depending on the predetermined context for the portion of the free form text input viewable on the display device and a geographical location of the user, generates the interaction-transaction interface to comprise:
selectable information to view about the company, the brand, or the product;
selectable option to purchase the product; or
a combination thereof; and
wherein the instructions further cause the system to:
determine authorized payment methods to purchase products using the interaction-transaction interface in the social forum, according to the social forum policy rules identifier;
complete a transaction according to at least one of the authorized payment methods, the payment methods including;
a method using currency native to a social forum; and
a method that converts credit in the currency native to the social forum to user selectable credits usable outside the social forum.

16. The system of claim 15, wherein the logic further causes the processor to:

identify, using a social forum policy rules identifier, rules that determine the functionality usable to implement and operate the interaction-transaction interface in the social forum, and
configure the interaction-transaction interface based on the identified rules.

17. The system of claim 15, wherein the instructions further cause the system to:
perform inline auto complete of metadata for the company, the brand, or the product in the portion of the input viewable on the display device that identifies the company, the brand, or the product.

18. A product of a computer readable non-transitory memory encoded with instructions which cause a data processing system to:
receive input from a user during the user's interaction in a social forum, the user identified by a user profile, wherein the input comprises free form text viewable on a display device;
determine whether the free form text input viewable on a display device includes a name of a company, a brand, or a product;
determine whether a positive or negative interest indicated in the user profile satisfies a user interest threshold, where the positive or negative interest indicated in the user profile indicates whether the user is interested in the company, the brand, or the product of the free form text input viewable on a display device;
tag a portion of the free form text input viewable on a display device when the portion of the free form text input viewable on a display device and the user interest threshold identify a predetermined context for the portion of the free form text input viewable on a display device as directed to the company, the brand, or the product, and wherein the tag a portion of the input comprises adding a selectable highlighted hypertext link to the free form text input viewable on the display device;
launch an interaction-transaction interface when the highlighted hypertext link of the free form text input viewable on a display device is selected, the selection occurring when a user input device or an icon associated therewith is positioned over a portion of the highlighted hypertext link of the free form text input viewable on a display device; and
depending on the predetermined context for the portion of the free form text input viewable on a display device and a geographical location of the user, generate the interaction-transaction interface to comprise:
selectable information to view about the company, the brand, or the product;
selectable option to purchase the product; or
a combination thereof; and
wherein the instructions further cause the data processing system to:
determine authorized payment methods to purchase products using the interaction-transaction interface in the social forum, according to a social forum policy rules identifier;
complete a transaction according to at least one of the authorized payment methods, the payment methods including:
a method using currency native to the social forum; and
a method that converts credit in the currency native to the social forum to user selectable credits usable outside the social forum.

19. The product of claim 18, wherein the instructions further cause the data processing system to:
   identify, using the social forum policy rules identifier, rules that determine the functionality usable to implement and operate the interaction-transaction interface in the social forum, and
   configure the interaction-transaction interface based on the identified rules.

20. The product of claim 18, wherein the instructions further cause the data processing system to:
   perform inline auto complete of metadata for the company, the brand, or the product in the portion of the input that identifies the company, the brand, or the product.

* * * * *